(12) United States Patent
Hersam et al.

(10) Patent No.: US 10,494,536 B2
(45) Date of Patent: *Dec. 3, 2019

(54) METHODS FOR PREPARATION OF CONCENTRATED GRAPHENE COMPOSITIONS AND RELATED COMPOSITE MATERIALS

(71) Applicant: Northwestern University, Evanston, IL (US)

(72) Inventors: Mark C. Hersam, Wilmette, IL (US); Yu Teng Liang, Chicago, IL (US)

(73) Assignee: Northwestern University, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/042,251

(22) Filed: Jul. 23, 2018

(65) Prior Publication Data

US 2018/0340090 A1 Nov. 29, 2018

Related U.S. Application Data

(63) Continuation of application No. 14/797,999, filed on Jul. 13, 2015, now Pat. No. 10,030,161, which is a
(Continued)

(51) Int. Cl.
*C01B 32/174* (2017.01)
*C09D 11/52* (2014.01)
(Continued)

(52) U.S. Cl.
CPC .......... *C09D 101/28* (2013.01); *C01B 32/174* (2017.08); *C08K 3/042* (2017.05);
(Continued)

(58) Field of Classification Search
CPC ..... C08K 3/042; C01B 32/174; C01B 32/182; C01B 32/184; C01B 32/19; B82Y 30/00; B82Y 40/00
(Continued)

(56) References Cited

U.S. PATENT DOCUMENTS

2008/0279756 A1 11/2008 Zhamu et al.
2010/0000441 A1 7/2010 Jang et al.
(Continued)

FOREIGN PATENT DOCUMENTS

| CN | 104263082 | 1/2015 |
|---|---|---|
| WO | 2010071858 | 6/2010 |
| WO | 2014210584 | 12/2014 |

OTHER PUBLICATIONS

Zhang "Graphene Nanosheet Counter-Electrodes for Dye—Sensitized Solar Cells." 2010 3rd International Nanoelectronics Conference (INEC), Jan. 3-8, 2010. (Year: 2010).*
(Continued)

*Primary Examiner* — Tri V Nguyen
(74) *Attorney, Agent, or Firm* — Locke Lord LLP; Tim Tingkang Xia, Esq.

(57) ABSTRACT

A rapid, scalable methodology for graphene dispersion with a polymer-organic solvent solution and subsequent solvent exchange, as can be utilized without centrifugation, to enhance graphene concentration.

17 Claims, 8 Drawing Sheets

(7 of 8 Drawing Sheet(s) Filed in Color)

Related U.S. Application Data continuation of application No. 13/453,608, filed on Apr. 23, 2012, now Pat. No. 9,079,764.

(60) Provisional application No. 61/478,361, filed on Apr. 22, 2011.

(51) Int. Cl.
*C09D 101/28* (2006.01)
*C08K 5/3415* (2006.01)
*C08K 5/10* (2006.01)
*C08K 5/20* (2006.01)
*C08K 5/05* (2006.01)
*C08K 3/04* (2006.01)

(52) U.S. Cl.
CPC ............... *C08K 5/05* (2013.01); *C08K 5/10* (2013.01); *C08K 5/20* (2013.01); *C08K 5/3415* (2013.01); *C09D 11/52* (2013.01)

(58) Field of Classification Search
USPC ........ 252/500, 502, 510, 511; 423/448, 460, 423/461
See application file for complete search history.

(56) References Cited

U.S. PATENT DOCUMENTS

| | | |
|---|---|---|
| 2010/0176351 A1 | 7/2010 | Ruoff et al. |
| 2011/0049437 A1 | 3/2011 | Crain et al. |
| 2011/0189452 A1 | 8/2011 | Lettow et al. |
| 2011/0284805 A1 | 11/2011 | Samulski et al. |
| 2011/0311432 A1 | 12/2011 | Pu et al. |
| 2015/0072162 A1 | 3/2015 | Hersam et al. |

OTHER PUBLICATIONS

Secor, E. et al., "Inkjet Printing of High Conductivity, Flexible Graphene Patterns", The Journal of Physical Chemistry Letters, 2013, vol. 4, No. 8, 1347-1351.

International Search Report and Written Opinion for PCT/US2016/048322 dated Nov. 30, 2016, 16 pages.

Yang, "Fabrication of High-Concentration and Stable Aqueous Suspensions of Graphene Nanosheets by Noncovalent Functionalization with Lignin and Cellulose Derivatives", JPCC, 114, pp. 3711-3816, (2010) /nt/.

Liang, "Highly Concentrated Graphene Solutions via Polymer Enhanced Solvent Exfoliation and Iterative Solvent Exchange", JAGS, 132, pp. 17661-17663, (2010) /nt/.

\* cited by examiner

METHODS FOR PREPARATION OF CONCENTRATED GRAPHENE COMPOSITIONS AND RELATED COMPOSITE MATERIALS

This application is a continuation of and claims priority to and the benefit of application Ser. No. 14/797,999 filed Jul. 13, 2015 and issued as U.S. Pat. No. 10,030,161 on Jul. 24, 2018, which was a continuation of and claimed priority to and the benefit of application Ser. No. 13/453,608 filed Apr. 23, 2012 and issued as U.S. Pat. No. 9,079,764 on Jul. 14, 2015, which claimed priority to and the benefit of application Ser. No. 61/478,361 filed Apr. 22, 2011—each of which is incorporated herein by reference in its entirely.

This invention was made with government support under DE-FG02-03ER15457 awarded by the United States Department of Energy. The government has certain rights in the invention.

BACKGROUND OF THE INVENTION

Graphene, a two-dimensional $sp^2$ hybridized lattice of carbon atoms, has generated intense interest due to its unique electronic, mechanical, chemical, and catalytic properties. Recent synthetic efforts have focused on the development of high-yield and scalable methods of generating graphene. These techniques include the direct exfoliation of either chemically modified or pristine graphene directly into various solvents. For example, graphene oxide (GO) can be exfoliated from graphite via acidic treatments. The resulting GO flakes contain hydroxyl, epoxyl, carbonyl, and carboxyl groups along the basal plane and edges that render GO strongly hydrophilic. The ease of dispersing GO in solution has facilitated the preparation of GO thin films and GO-polymer nanocomposites with interesting and potentially useful mechanical properties. However, due to the defects and consequent disruption of the graphene band structure introduced during oxidation, GO is a poor electrical conductor. Although the level of oxygenation can be partially reversed through additional chemical reduction steps, significant quantities of structural and chemical defects remain. Moreover, the electrical conductivity of reduced GO flakes is less than optimal and is certainly deficient by comparison to pristine graphene.

In an effort to circumvent such GO limitations, recent efforts have focused on direct solution-phase exfoliation of pristine graphene. Graphene sheets can be extracted using superacids, by sonication in surfactant solutions and through use of organic solvents. For example, superacids have demonstrated an unprecedented graphene solubility of 2 mg/mL through the protonation and debundling of graphitic sheets. However, the resulting solutions are not ideally suited for additional processing due to their acidity-dependent solubility and high reactivity. Direct exfoliation of graphene in surfactant solutions and select organic solvents has also been demonstrated with concentrations up to 0.3 mg/mL and 1.2 mg/mL, respectively, but such concentrations are achieved only following prolonged sonication times—approaching 3 weeks in duration—or extended ultracentrifugation.

Processing complexities represent a bottleneck for fundamental studies and end-use applications that require well-dispersed, highly concentrated, pristine graphene solutions. Accordingly, there remains an on-going search in the art for an improved approach to graphene solution concentrations sufficient to better realize the benefits and advantages available from graphene and related material compositions.

SUMMARY OF THE INVENTION

In light of the foregoing, it is an object of the present invention to provide methods relating to the preparation of concentrated graphene media, together with corresponding compositions and composites available therefrom, thereby overcoming various deficiencies and shortcomings of the prior art, including those outlined above. It will be understood by those skilled in the art that one or more aspects of this invention can meet certain objectives, while one or more aspects can meet certain other objectives. Each objective may not apply equally, in all its respects, to every aspect of this invention. As such, the following objects can be viewed in the alternative, with respect to any one aspect of this invention.

It can be an object of the present invention to provide an economical, efficient approach to the preparation of graphene solutions and corresponding graphene ink compositions at concentrations sufficient for end-use applications.

It can also be an object of the present invention to provide a rapid, scalable methodology for preparation of highly-concentrated graphene media without impractical, time-inefficient sonication and centrifugation operations.

It can also be an object of the present invention, alone or in conjunction with one of the preceding objectives, to provide a rapid, scalable methodology which can utilize low-cost organic solvents otherwise deemed ineffective for purposes of graphene exfoliation and/or dispersion.

Other objects, features, benefits and advantages of the present invention will be apparent from the summary and the following descriptions of certain embodiments, and will be readily apparent to those skilled in the art having knowledge of various graphene preparation methods. Such objects, features, benefits and advantages will be apparent from the above as taken into conjunction with the accompanying examples, data, figures and all reasonable inferences to be drawn therefrom.

In part, the present invention can provide a method of using a cellulosic polymer for preparing concentrated graphene media and related compositions. Such a method can comprise exfoliating a graphene source material with a medium comprising an organic solvent at least partially miscible with water and a cellulosic polymer dispersing or stabilizing agent at least partially soluble in such an organic solvent; contacting at least a portion of such an exfoliated graphene medium with a hydrophobic fluid component; and hydrating such a graphene medium to concentrate exfoliated graphene in such a hydrophobic fluid component. Without limitation, such concentration can be achieved without application of centrifugal force.

In certain non-limiting embodiments, such an organic solvent can be selected from suitable alcohols, esters, amides, ethers, and ketones and combinations thereof, such a solvent as can partially solubilize such a cellulosic dispersing agent. In certain such embodiments, such a solvent can comprise ethanol or dimethylformamide. Regardless of solvent identity, such a dispersing agent can comprise a cellulose polymer about 46-about 48% ethoxylated.

Without limitation as to identity of an organic solvent and/or a dispersing agent, a hydrophobic fluid component of this invention can be selected from fluid hydrophobic components at least partially miscible with such an organic solvent but immiscible with water. Such hydrophobic components include, without limitation, chloroform, ~$C_6$-~$C_8$ alkanes, terpenes, terpene alcohols and combinations thereof. In certain embodiments, such a hydrophobic fluid component can comprise a terpineol. Regardless, such a method can utilize a graphite as a graphene source material.

Without limitation as to organic solvent, dispersing agent and/or hydrophobic fluid component, a method of this invention can comprise iterative separation of a graphene-hydrophobic fluid component from such an organic solvent medium, and subsequent contact with another portion of such an exfoliated graphene medium. A resulting concentrated graphene ink can be applied to a substrate component, then can be annealed to remove residual dispersing agent.

In part, the present invention can also be directed to a method of concentrating a graphene medium. Such a method can comprise exfoliating graphene from a graphene source material with a medium comprising an organic solvent selected from ethanol and dimethylformamide, and an ethyl cellulose; contacting at least a portion of such an exfoliated graphene medium with a terpineol; adding water to the graphene medium to concentrate exfoliated graphene within such a terpineol component; separating such a graphene-terpineol component from such a hydrated medium; and, optionally, iterative contact of such a separated graphene-terpineol fluid component with additional portions of an exfoliated graphene medium, to concentrate graphene therein. Such concentration can be achieved absent centrifugation. A graphene ink resulting from such iterative concentrations can be applied to a suitable substrate, then annealed to remove dispersing agent.

Accordingly, the present invention can also be directed to a composition comprising graphene, a hydrophobic fluid component at least partially immiscible with an aqueous medium and a graphene dispersing/stabilizing agent at least partially soluble in such a hydrophobic fluid component. Without limitation, such a dispersing agent can comprise an ethyl cellulose. In various embodiments, regardless of dispersing agent, such a hydrophobic fluid component can comprise a component selected from terpenes, terpene alcohols and combinations thereof. In certain such embodiments, such a hydrophobic fluid component can comprise a terpineol.

Regardless, a composition of this invention can comprise a graphene concentration of greater than about 1 mg/ml. Without limitation as to any particular graphene concentration, such a composition can consist of unagglomerated graphene flakes, such a morphology as can be evidenced by atomic force microscopy. Regardless, in certain embodiments, such a composition can be applied to a substrate, such an applied composition comprising directionally-aligned graphene flakes.

The present invention can, in part, be directed to a composite comprising a graphene component coupled to a substrate component, such a graphene component as can comprise nanodimensioned flakes in a disordered network on such a substrate. Alternatively, a graphene component can be considered as comprising an annealation product of an ethyl cellulose-stabilized graphene composition. Such an annealation product can comprise a transparent conductive graphene thin film, such a thin film transparent at visible and/or infrared wavelengths. Regardless, a graphene flake component of such a composite can be characterized by Raman spectroscopy and a Raman spectrum providing an I(D)/I(G) value less than about 0.75. Without limitation, such a substrate can comprise a silicon oxide material.

In part, the present invention can also be directed to a method for exfoliating, dispersing or otherwise separating layered, bundled or otherwise agglomerated nanomaterials including, without limitation, carbon nanotubes, such materials as can then be concentrated in a fluid medium. As but one example, such a method can comprise providing a single-walled, double-walled or multi-walled carbon nanotube material in a medium comprising an organic solvent at least partially miscible with water and a carbon nanotube dispersing/stabilizing agent at least partially soluble therein; contacting at least a portion of such a carbon nanotube medium with a hydrophobic fluid component; hydrating such a medium to concentrate carbon nanotubes within such a hydrophobic fluid component; separating such a nanotube component from such a hydrated medium; and, optionally, iterative contact/separation of such a separated nanotube-fluid component with additional portions of the aforementioned carbon nanotube medium.

Without limitation, an organic solvent medium can comprise ethanol or a solvent selected from those described herein or as would otherwise be known to those skilled in the art to be at least partially miscible in an aforementioned hydrophobic fluid component. Likewise, such a carbon nanotube dispersing/stabilizing agent can comprise an ethyl cellulose or an agent as would otherwise be understood by those skilled in the art at least partially soluble in an aforementioned organic solvent medium. Likewise, a hydrophobic fluid component useful in conjunction with the present invention can comprise a component selected from one or more mono-terpene alcohols and various other fluid components described herein or as would otherwise be understood by those skilled in the art and made aware of this invention. Regardless, a carbon nanotube ink or related such fluid component resulting from such iterative concentrations can be applied to a suitable substrate, then processed as described herein or as would otherwise be needed for a particular end-use application.

Accordingly, the present invention can also be directed to a composition comprising carbon nanotubes (e.g. single-walled carbon nanotubes), a hydrophobic fluid component at least partially immiscible with an aqueous medium and a nanotube dispersing/stabilizing agent at least partially soluble in such a hydrophobic fluid component. Without limitation, such a dispersing agent can comprise ethyl cellulose. In various embodiments, regardless of dispersing agent, such a hydrophobic fluid component can comprise a component selected from terpenes, terpene alcohols and combinations thereof. In certain such embodiments, such a hydrophobic fluid component can comprise a terpineol. Regardless, a composition of this invention can comprise a carbon nanotube concentration of greater than about 1 mg/ml.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF CERTAIN EMBODIMENTS

Without limitation, various embodiments of this invention demonstrate an alternative strategy for enhancing graphene exfoliation using a polymer-organic solvent composition. More specifically, as relates to certain such embodiments, a room-temperature, ultracentrifuge-free concentration technique can be used to generate graphene concentrations in excess of 1 mg/mL in organic solvents that otherwise yield poor graphene dispersability. The resulting graphene inks are amenable to further processing, including casting into aligned graphene-polymer nanocomposites and blade coating to form thin films, as a result of their low solvent boiling point and non-causticity. Because the present invention avoids oxidative conditions, the graphene maintains superlative electronic properties, which can be exploited in applications that require highly conductive, mechanically flexible, and solution-processable coatings.

Due to the large mismatch between the surface energies of ethanol and graphite, ethanol is a relatively poor solvent for graphene exfoliation, yielding a post-sedimentation concentration of 1.6 µg/mL. (See, Hernandez, Y.; Lotya, M.; Rickard, D.; Bergin, S. D.; Coleman, J. N.; *Langmuir* 2010, 26, 3208-3213.) To overcome this limitation, a cellulosic polymer was used to enhance the ability of ethanol to exfoliate and suspend graphene flakes. Such polymers include, but are not limited to ethyl cellulose, methyl cellulose, hydroxyethyl cellulose, carboxymethyl cellulose, and hydroxypropylmethyl cellulose. Using ethyl cellulose (EC), a solution of 50 mg/mL natural graphite flakes in 1% w/v EC-ethanol was sonicated for 3 hr and centrifuged at 7,500 rpm for 4.5 hr to remove the fast sedimenting graphite flakes. The resulting supernatant provides primarily few-layer graphene sheets. Optical absorbance was taken to determine the graphene concentration using an absorption coefficient of 2,460 L/g·m at 660 nm. Without limitation as to any one theory or mode of operation, addition of up to about 1% or more EC significantly enhanced the graphene exfoliation efficiency by providing steric stabilization of the exfoliated flakes, yielding a post-sedimentation concentration of 122.2 µg/mL. Despite this improvement, still higher concentrations were desired to generate graphene inks that can be easily deposited and patterned.

Figure 1A:
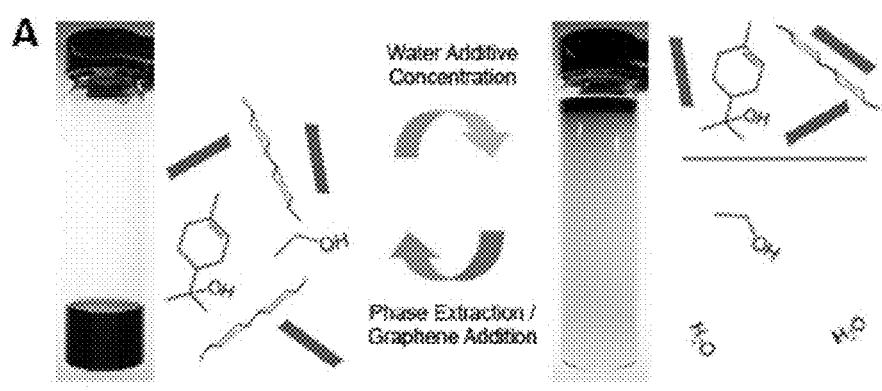
FIGS. 1A-B. (A) Digital images of vials of a 1:5 mixture of terpineol and ethyl cellulose stabilized graphene-ethanol solution before and after water addition. As shown by the colored images, upon the addition of water, the hydrophobic graphene flakes preferentially separate into the concentrated terpineol fraction, leaving behind an ethanol and water mixture. (B) The concentration factor of graphene ($C_0$=102.4 µg/mL) is plotted after each solvent exchange concentration and graphene-ethanol addition step for three iterations.
Figure 1B:
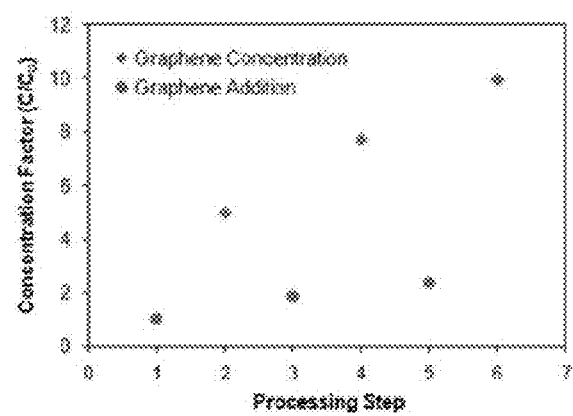
Figure 2A:
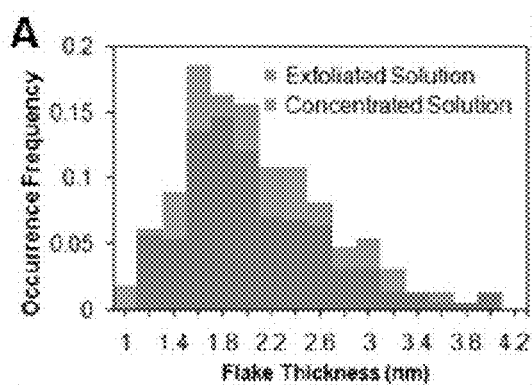
FIGS. 2A-D. (A) Histograms of flake thickness for the initially exfoliated and third-iteration concentrated graphene solutions. (B) Digital scanning electron micrograph (SEM) images of a graphene-ethyl cellulose nanocomposite fracture surface. (C) Optical transmittance versus sheet resistance for annealed transparent conductive thin films blade coated from the concentrated graphene inks. (D) SEM image of an annealed graphene thin film.

Towards this end, an iterative solvent exchange was employed as a rapid room-temperature process to concentrate graphene solutions—without the application of centrifugal force. Various hydrophobic fluid solvent components at least partially miscible with an organic solvent such an ethanol (or e.g., dimethylformamide or methylpyrrolidone), but not miscible with an aqueous solvent component (e.g., ethanol and water) can be utilized. In particular, a 1:5 volume ratio solution of terpineol and sedimented graphene solution was prepared and mixed to yield a solution with an initial graphene concentration of $C_0$=102.4 µg/mL. Water, four times the volume of this initial solution, was then added to form a hydrophilic ethanol solution. Again, without limitation to theory or mode of operation, because of the hydrophobicity of the EC-stabilized flakes, graphene is believed preferentially concentrated into the terpineol band on top of the ethanol-water solution (FIG. 1A). This terpineol phase was then harvested and additional sedimented graphene solution was added for the next concentration iteration. Concentration factors, $C/C_o$, were determined after each step through optical absorbance for three concentration iterations (FIG. 1B). As expected, the concentration factors correspond roughly to the volumetric reduction of the graphene solution, producing a highly concentrated graphene ink at 1.02 mg/mL after three iterations. Additional iterations of solvent exchange yielded diminishing returns as the viscosity of the graphene ink begin to interfere with material separation within the system. In order to verify the absence of flake agglomeration during the concentration process, atomic force microscopy was performed on over 140 flakes deposited from the sedimented graphene solution and the third iteration graphene ink. Both media exhibited similar flake thickness histograms peaked at approximately 1.6-1.8 nm (FIG. 2A), suggesting minimal graphene agglomeration during the concentration process.

Figure 2B:
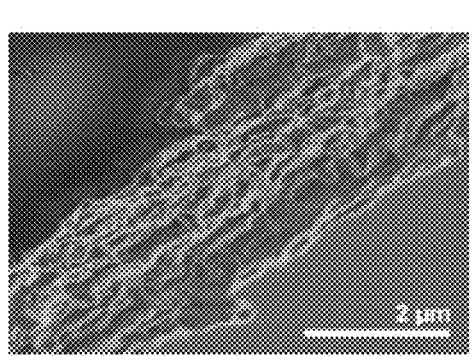

Graphene-polymer nanocomposites were solution cast from these graphene inks. The height reduction associated with anisotropic volume contraction during solvent evaporation resulted in the directional alignment of the graphene flakes within the nanocomposite. In FIG. 2B, this alignment is evident on the fracture surface in the form of sheared terraces orthogonal to the direction of the volumetric contraction. The lack of protruding graphene flakes on the fracture surface is not only indicative of flake alignment but also suggests strong interactions between the polymer and graphene.

Figure 2C:
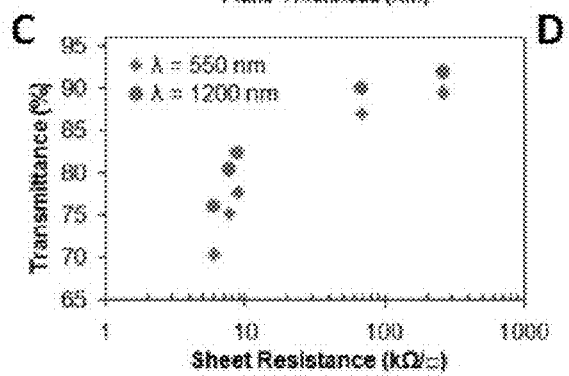
Figure 2D:
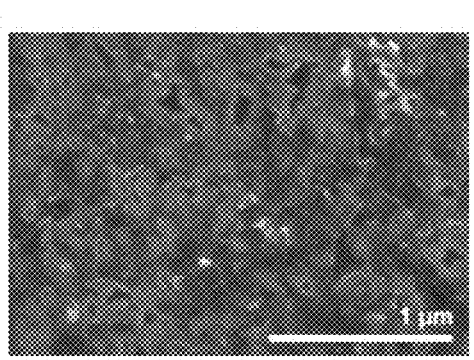

The electrical properties of thin films derived from the concentrated graphene ink were assessed via transparent conductor measurements. Due to their enhanced rheology, film forming capability, and dispersion stability, EC-stabilized graphene inks are amenable to blade coating onto a broad range of substrates. For example, graphene inks were blade coated onto glass slides at varying thicknesses, annealed at 400° C. for 30 min in air, and rinsed with acetone to produce transparent conductive thin films. Four point probe measurements of the film sheet resistance indicate that their electrical performance compare favorably to films deposited by vacuum filtration from sedimented surfactant graphene solutions (FIG. 2C). Electron microscopy performed on these conductive graphene thin films (FIG. 2D) reveals a disordered network of graphene flakes with lateral dimensions ranging from approximately 50-400 nm. Raman spectra provide further evidence that these graphene thin films possess low defect densities and negligible oxidation.

As demonstrated, efficient graphene exfoliation can be achieved in ethanol through polymeric stabilization using ethyl cellulose. The resulting graphene solutions can be concentrated via rapid, room-temperature, ultracentrifugation-free iterative solvent exchange, ultimately yielding stable graphene inks at mg/mL levels. The outstanding processability and electrical properties of the resulting inks enable the straightforward production of functional graphene-based materials including highly anisotropic polymer nanocomposites and transparent conductive thin films. Such results can promote ongoing efforts to understand and exploit solution-processable pristine graphene for fundamental studies and device applications.

EXAMPLES OF THE INVENTION.

The following non-limiting examples and data illustrate various aspects and features relating to the methods and/or compositions of the present invention, including the preparation and use of concentrated graphene solutions, compositions and related composites, as are described herein. In comparison with the prior art, the present methods provide results and data which are surprising, unexpected and contrary thereto. While the utility of this invention is illustrated through the use of several graphene dispersion agents and hydrophilic organic solvents, together with several hydrophobic fluid components which can be used therewith, it will be understood by those skilled in the art that comparable results are obtainable with various other dispersion agents and hydrophilic or hydrophobic solvents, as are commensurate with the scope of this invention.

Example 1a

Exfoliation and Sedimentation Processing of Graphene. 2.5 g of natural graphite flake (3061 grade, Asbury Graphite Mills) was added to 50 mL of 1% w/v ethyl cellulose (EC) (Aldrich) ethanol (EtOH) solution inside a plastic 50 mL centrifuge tube (note that Aldrich does not explicitly provide the molecular weight of its EC; rather, the viscosity is specified (e.g., 4 cP) when the EC is loaded at 5% w/v in 80:20 toluene:ethanol). Two tubes containing this mixture were simultaneously sonicated in a Bransonic 3510 tabletop ultrasonic cleaner for 3 hr at 40 kHz and 100 W. In order to efficiently sediment out the graphite flakes, the centrifugation was performed in a two-step process. First, the sonicated graphene dispersions were centrifuged in a large volume centrifuge (Beckman Coulter Avanti J-26 XP Centrifuge) for 10 min at 7,500 rpm to remove the fast sedimenting graphite flakes. The supernatant was then decanted from each 50 mL centrifuge tube and combined. A second sedimentation step was then performed on this combined solution in two 250 mL tubes for 4.5 hr at 7,500 rpm or an average relative centrifugal force (RCF) of 6,804 g.

Example 1b

Thermal Stability of Polymer Enhanced Graphene Dispersions. Experiments were undertaken to highlight the thermal stability of EC-based graphene dispersions, of the sort discussed above, especially in comparison to traditional surfactant-based dispersions. Here, graphene dispersions in 1% w/v EC-EtOH and 1% w/v sodium cholate-water (SC—$H_2O$, prior art) were produced using the sonication and centrifugation procedures detailed above. Both dispersions were then concentrated to ~1 mg/mL via thermal evaporation.

At elevated temperatures, graphene flakes in the SC-based dispersion agglomerate rapidly to form precipitates, while the EC-based dispersion remains well dispersed. To quantify their thermal stabilities, both concentrated dispersions were diluted to 0.1 mg/mL and centrifuged at 15,000 rpm for 1 min. The UV-vis absorbance spectra for their supernatants were then obtained. Using the same absorbance coefficient discussed above (2460 L/g·m at 660 nm), it was determined that 97.7% of the graphene remained suspended in the EC-EtOH medium, while only 18.1% remained suspended in the SC—$H_2O$ solution. The stability of these polymer-based graphene dispersions can be exploited in subsequent post-synthetic processing.

Example 1c

Figure 1C:
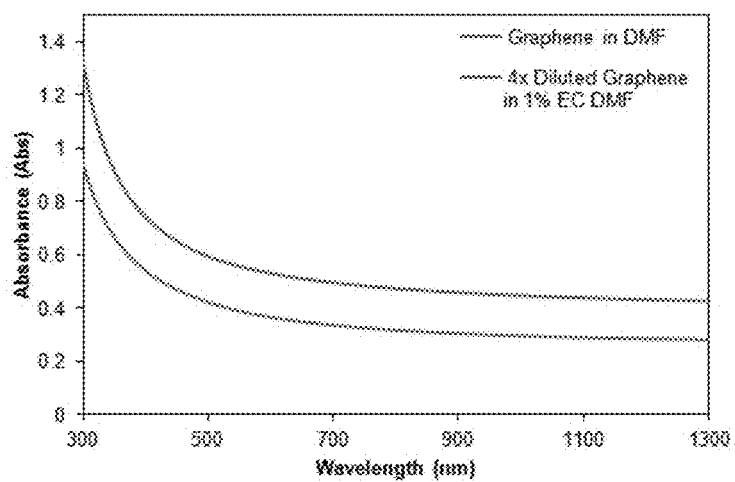
FIG. 1C. UV-vis absorbance spectra for graphene dispersed in DMF and 1% w/v EC-DMF. Due to the high graphene concentration of the EC-DMF dispersion, the sample was diluted 4× in DMF to obtain a clear absorbance spectra.

Enhanced Graphene Production Efficiency in DMF. Improvement in graphene production is also demonstrated by adding EC to dimethylformamide (DMF), which has moderate intrinsic graphene solubility. In this case, natural graphite was bath sonicated for 3 h at 50 mg/mL in both DMF and 1% w/v EC-DMF. After centrifugation at 7500 rpm for 4.5 h to remove the thick graphite flakes, UV-vis absorbance spectra were taken to assess their graphene concentrations (FIG. 1C).

Using an absorbance coefficient of 2460 L/g·m at 660 nm, the graphene concentration for the DMF and EC-DMF dispersions were determined to be 14.1 and 82.8 µg/mL, respectively. (See, Hernandez, Y.; Nicolosi, V.; Lotya, M.; Blighe, F. M.; Sun, Z.; De, S.; McGovern, I. T.; Holland, B.; Byrne, M.; Gun'Ko, Y. K.; Boland, J. J.; Niraj, P.; Duesberg, G.; Krishnamurthy, S.; Goodhue, R.; Hutchison, J.; Scardaci, V.; Ferrari, A. C.; Coleman, J. N., *Nat. Nanotechnol.* 2008, 3, 563-568). It follows that, the addition of 1% w/v EC to DMF yielded a 5.9-fold improvement in the graphene exfoliation/production efficiency. Overall, improving the graphene exfoliation efficiency in organic solvents with moderate to high intrinsic graphene solubilities can both reduce material waste and benefit printed electronic and related applications where higher graphene-to-dispersant ratios are required.

In accordance with this invention, without limitation, various other $C_2$-$C_5$ alcohols, esters, ethers, ketones and amides can be used, in conjunction with a cellulosic polymer, to suspend and exfoliate graphene.

Example 2

Graphene Concentration via Iterative Solvent Exchange. To ensure proper hydrophobic phase separation, water, in excess of four times the volume of the starting graphene solution, is added. A brief sonication step, of approximately 1 min, is also performed after each graphene concentration and graphene addition step to facilitate phase separation and solution mixing.

Example 3

$SiO_2$ Graphene Deposition. Graphene flakes from both the sedimented graphene solution and third-iteration concentrated graphene solution were deposited onto 100 nm thick oxide silicon wafers for imaging. The wafers were first submerged in 2.5 mM 3-aminopropyl triethoxysilane aqueous solution to functionalize the surface with a hydrophobic self-assembling monolayer for 30 min. The substrates were then rinsed with water and dried under a stream of $N_2$. Both graphene solutions were then diluted to approximately 0.02 mg/mL in ethanol after which a drop of each was placed onto the functionalized wafers for 10 min. The drops were then blown off under a stream of $N_2$, and the wafer was rinsed with water. To remove the residual EC, the wafers were annealed for 20 min at 400° C. in air.

Example 4

Figure 3A:
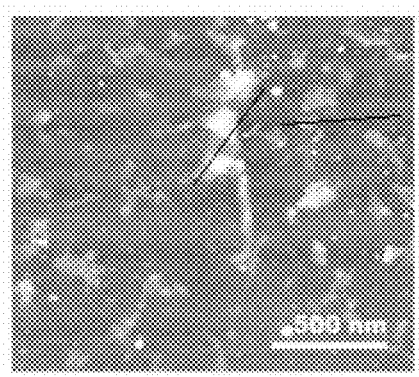
FIGS. 3A-B. (A) Digital AFM image of graphene flakes deposited on $SiO_2$. (B) Line scan profiles of two deposited graphene flakes, with the larger flake exhibiting edge folding.
Figure 3B:
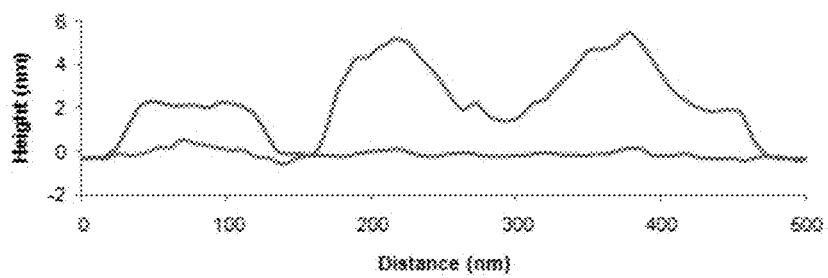

Atomic Force Microscopy Thickness Measurements. All atomic force microscopy (AFM) images were obtained using a Thermo Microscopes Autoprobe CP-Research AFM in tapping mode using cantilever B on MikroMasch NSC NSC36/Cr-AuBS probes. 2 μm×2 μm images were collected using identical scanning parameters. Flake thicknesses were determined using line-scan thickness profiles across flakes larger than 5,000 nm$^2$ while avoiding regions where EC residues were present. (FIGS. 3A-B) 146 flakes were analyzed on the wafer deposited with the sedimented graphene solution, and 156 flakes were analyzed for the wafer deposited with the third-iteration concentrated graphene solution.

Example 5

Thin Film Deposition. Graphene-EC and graphene thin films were blade coated from concentrated graphene inks onto glass slides using either 1 or 2 layers of 3M Scotch Magic Tape (about 30-about 40 μm per layer) as masks. In order to optimize ink rheology for uniform film deposition, 10% w/v EC (Aldrich, 22 cP, 5% in toluene:ethanol 80:20) in ethanol was added to the graphene ink. The modified graphene ink was deposited into 2 cm×2 cm squares on 2.54 cm×2.54 cm silica glass slides. To obtain films with different optical densities, select films were also spun at 10,000 rpm for 3 min. These films were then allowed to dry overnight, and the mask was removed to obtain a transparent graphene-polymer film (not shown). Graphene thin films require an additional annealing step, performed for 30 min at 400° C. in air, to remove the EC and enhance flake-to-flake contact. After annealing, these graphene thin films were rinsed in acetone before optical transmittance and four point probe measurements.

Example 6

Figure 4:
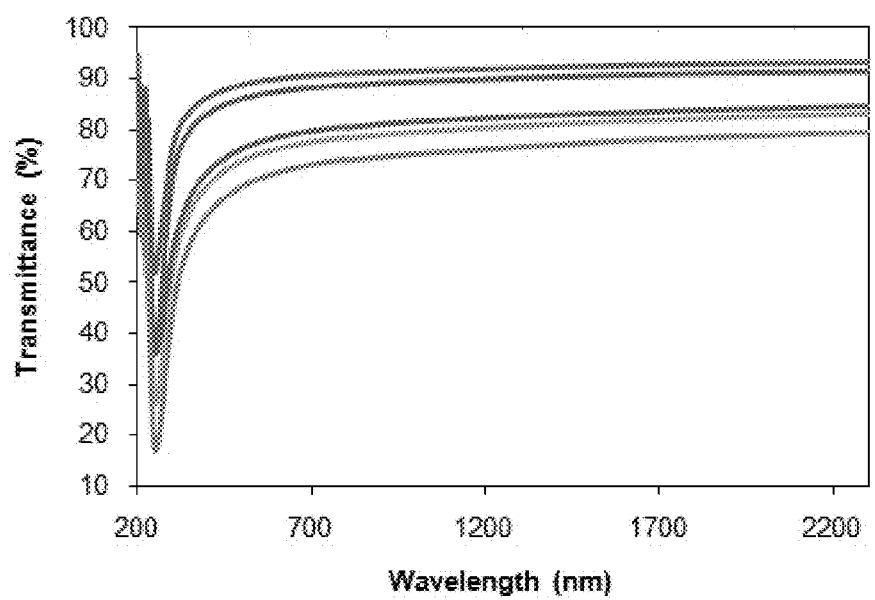
FIG. 4. Optical transmittance spectra for the five graphene conductive films analyzed.

Optical Absorbance and Transmittance Measurement. Optical absorbance measurements to determine graphene solution concentrations and transmittance measurements for transparent conductive graphene thin films were performed using a Varian Cary 5000 spectrophotometer. Background from the optical cuvette, EC-ethanol solution, and glass slide were subtracted from the spectra of the graphene dispersions and films. Due to their high absorbance, concentrated graphene solutions were diluted either 4× or 10× to ensure that the optical absorbance was within the detector limits. As expected, the graphene thin films of the preceding example provide featureless optical absorbance spectra with high transparency at visible and infrared wavelengths (FIG. 4).

Example 7

Figure 5:
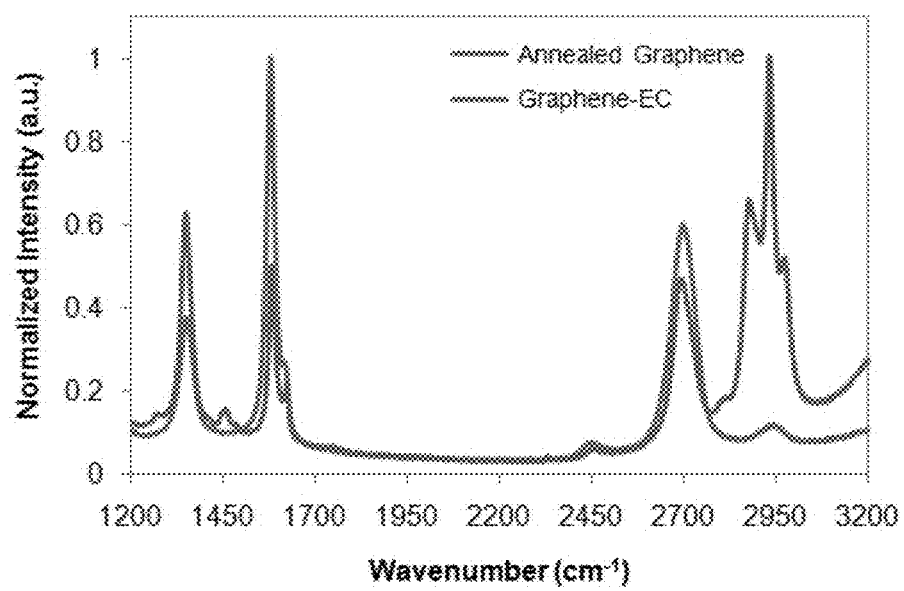
FIG. 5. Representative Raman spectra of the annealed graphene thin film and graphene-EC nanocomposite. These spectra were obtained by combining five individual spectra from different locations of each film and with the intensity of the highest peak normalized to unity.

Raman Spectroscopy of the Graphene Films. Raman spectroscopy was obtained using a Renishaw inVia Raman microscope with an excitation wavelength of 514 nm. Five spectra were obtained on different areas of the annealed graphene film and the graphene-EC nanocomposite using a beam size of 1-2 μm, allowing multiple flakes to be probed in each measurement. These spectra showed minimal variation across different locations and were combined to form a representative Raman spectrum for the entire film (FIG. 5). Typical Raman spectra for the annealed graphene film exhibit four primary peaks: the G band at ~1,590 cm$^{-1}$, 2D band at ~2,700 cm$^{-1}$, and the disorder-associated D and D' bands at ~1,350 cm$^{-1}$ and ~1,620 cm$^{-1}$ respectively. The intensity ratio of the D and G bands, I(D)/I(G), is a measure of the level of defects that are introduced during the sonication and annealing processes. The I(D)/I(G) value for the annealed graphene film was ~0.38, significantly less than reported values for surfactant exfoliated graphene solutions with a similar size distribution (~0.93) (see, Green, A. A.; Hersam, M. C.; *Nano Lett.* 2009, 9, 4031-4036) and heavily reduced graphene oxide (~0.82) (Gao, W.; Alemany, L. B.; Ci, L.; Ajayan, P. M. *Nature Chem.* 2009, 1 (5), 403-408) but higher than that for larger-sized solvent exfoliated graphene flakes. (See, Hernandez, Y.; Nicolosi, V.; Lotya, M.; Blighe, F. M.; Sun, Z.; De, S.; McGovern, I. T.; Holland, B.; Byrne, M.; Gun'Ko, Y. K.; Boland, J. J.; Niraj, P.; Duesberg, G.; Krishnamurthy, S.; Goodhue, R.; Hutchison, J.; Scardaci, V.; Ferrari, A. C.; Coleman, J. N. *Nat. Nanotechnol.* 2008, 3, 563-568.) The measured value of ~0.38 indicates that large quantities of defects or oxidation were not introduced during exfoliation and annealing.

Example 8

Figure 6:
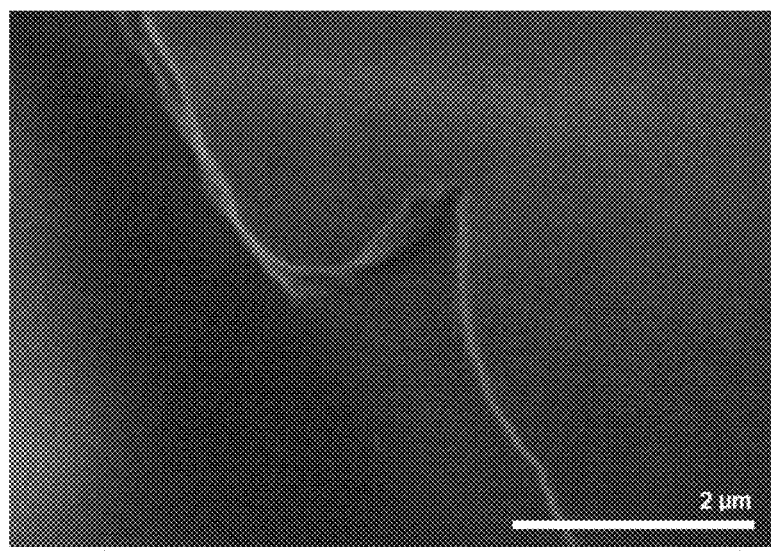
FIG. 6. Digital SEM image of an EC film fracture surface without graphene. The absence of the fracture terraces, in contrast to those observed in FIG. 2B, indicates that the anisotropic fracture behavior of the EC-graphene nanocomposite results from aligned graphene flakes.

Nanocomposite Fracture Surface. The graphene-EC and graphene-free EC films were fractured using shearing forces applied orthogonally to the planes of the films. The fractured surfaces were then analyzed using SEM to gauge the adhesion strength of graphene to EC and orientation of graphene flakes. (See, FIG. 6.)

Example 9

Scanning Electron Microscopy. Scanning electron microscopy of the transparent conductive graphene thin films and fracture surfaces of graphene-EC nanocomposites was performed on a Hitachi 4800 scanning electron microscope using a 1 kV accelerating voltage.

Example 10

Figure 7A:
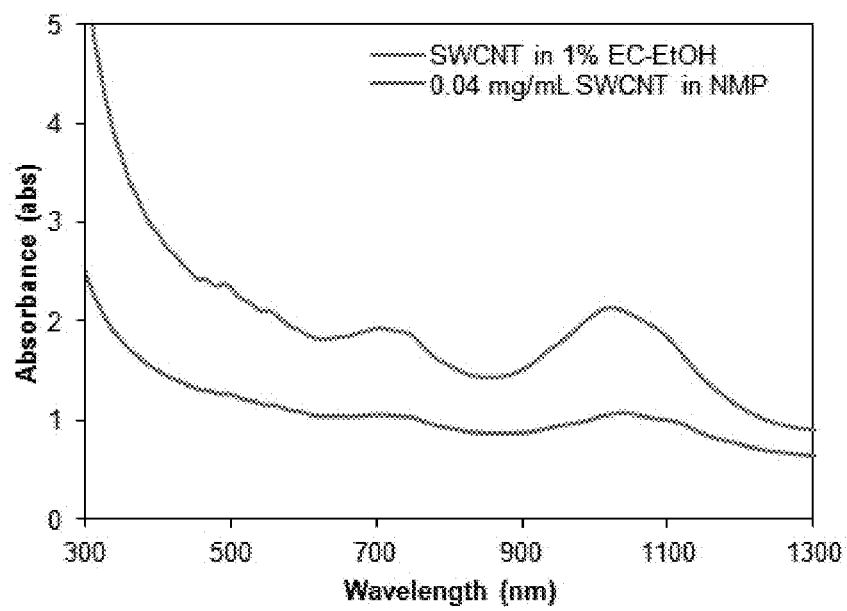
FIGS. 7A-B. (A) absorbance spectra for dispersions of single-walled carbon nanotubes, showing enhanced debundling and concentration using ethyl cellulose-ethanol, in accordance with this invention. (The reference dispersion also illustrates the utility of methylpyrrolidone as an organic solvent component, in accordance with this invention.) (B) a digital SEM image of an annealed SWCNT thin film.
Figure 7B:
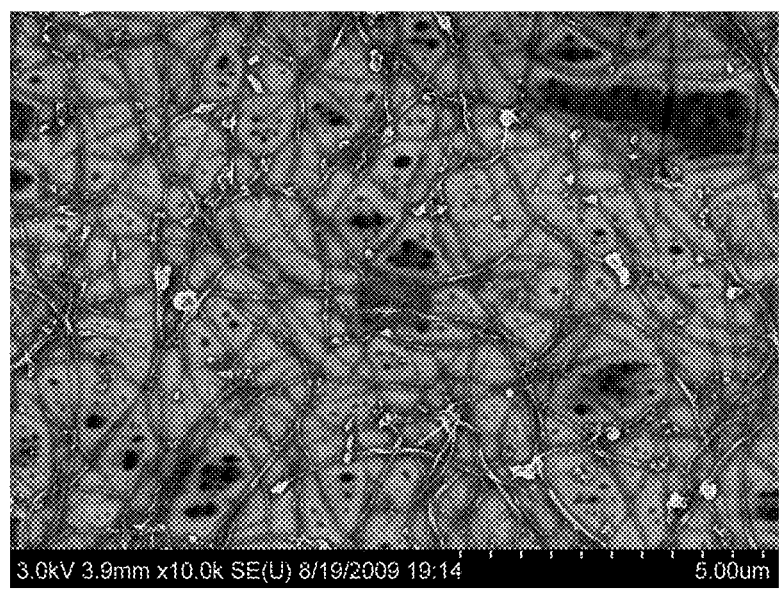

Dispersion and iterative solvent exchange can be used concentrate fluid media comprising other nanodimensioned materials, such as single-walled carbon nanotubes, using procedures analogous to those described in examples 1-2. For instance, single walled carbon nanotubes (SWCNTs) were dispersed in 1% EC-EtOH via 1 h horn sonication and 4.5 h centrifugation at 7500 rpm. Compared to a reference 0.04 mg/mL SWCNT/N-methylpyrrolidone (NMP) dispersion, without EC, the concentration of the 1% EC-EtOH dispersion was determined to be around 0.75 mg/mL (see, FIG. 7A). Solvent exchange with terpineol provided a concentrated SWCNT-EC ink. Likewise, substrate deposition and material characterization can be accomplished, using techniques of sort described in examples 3-9. A transparent SWCNT thin film was prepared by blade coating and annealing the aforementioned ink at 400° C. in air for 30 minutes. An SEM image of the annealed SWCNT thin film is shown in FIG. 7B.

As demonstrated, above, the present invention provides a method for enhanced concentration of graphene, carbon nanotubes, and related nanomaterials to provide, in particular, graphene concentrations heretofore unrealized in the art. Such techniques are rapid and scalable, making more readily available the various mechanical, chemical and electronic attributes of such materials over a wide range of end-use applications.

We claim:

1. A method of using a cellulosic polymer to provide concentrated graphene in preparation of a graphene ink composition, said method comprising:
    exfoliating a graphene source material with a medium comprising an organic solvent at least partially miscible with water and a dispersing agent comprising a cellulosic polymer at least partially soluble in said organic solvent, said graphene source material not oxidized wherein said graphene source material is a graphite and, wherein said organic solvent is selected from $C_2$-$C_5$ alcohols, esters, amides, ethers and ketones and combinations thereof;
    contacting at least a portion of said exfoliated graphene medium with a hydrophobic fluid component; and
    hydrating said exfoliated graphene medium to concentrate said exfoliated graphene in said hydrophobic fluid component, said concentrated graphene medium is achieved without application of centrifugal force.

2. The method of claim 1 wherein said dispersing agent comprises an ethyl cellulose.

3. The method of claim 1 wherein said organic solvent is selected from ethanol, methylpyrrolidone and dimethylformamide.

4. The method of claim 1 wherein said hydrophobic fluid component is selected from terpenes, terpene alcohols and combinations thereof.

5. The method of claim 4 wherein said hydrophobic fluid component comprises a terpineol.

6. The method of claim 1 further comprising iterative separation of said graphene-hydrophobic fluid component from said organic solvent and contact with another portion of said exfoliated graphene medium, to provide a graphene ink composition.

7. The method of claim 6 comprising application of said graphene ink medium on a substrate.

8. The method of claim 7 wherein said graphene ink medium is annealed to remove said dispersing agent.

9. A method of using a cellulosic polymer to prepare a graphene ink composition, said method comprising:
    exfoliating a graphene source material with a medium comprising an organic solvent at least partially miscible with water and a dispersing agent comprising a cellulosic polymer at least partially soluble in said organic solvent, said graphene source material not oxidized;
    contacting at least a portion of said exfoliated graphene medium with a hydrophobic fluid component;
    hydrating said exfoliated graphene medium to concentrate said exfoliated graphene in said hydrophobic fluid component, said concentrated graphene medium is achieved without application of centrifugal force; and
    iteratively separating said graphene-hydrophobic fluid component from said organic solvent and contact with another portion of said exfoliated graphene medium, to provide a graphene ink composition.

10. The method of claim 9 wherein said dispersing agent comprises an ethyl cellulose.

11. The method of claim 9 wherein said organic solvent is selected from $C_2$-$C_5$ alcohols, esters, amides, ethers and ketones and combinations thereof.

12. The method of claim 11 wherein said organic solvent is selected from ethanol, methylpyrrolidone and dimethylformamide.

13. The method of claim 9 wherein said hydrophobic fluid component is selected from terpenes, terpene alcohols and combinations thereof.

14. The method of claim 13 wherein said hydrophobic fluid component comprises a terpineol.

15. The method of claim 9 wherein said graphene source material is a graphite.

16. The method of claim 9 comprising application of said graphene ink medium on a substrate.

17. The method of claim 16 wherein said graphene ink medium is annealed to remove said dispersing agent.

* * * * *